United States Patent
Mizuki, Sr.

(10) Patent No.: US 6,305,165 B1
(45) Date of Patent: Oct. 23, 2001

(54) METHODS AND APPARATUS FOR ACQUIRING FREE ENERGY USING BUOYANCY TECHNOLOGY

(76) Inventor: Mikiso Mizuki, Sr., 2675 E. Flamingo Rd., #2, Las Vegas, NV (US) 89121

( * ) Notice: Subject to any disclaimer, the term of this patent is extended or adjusted under 35 U.S.C. 154(b) by 0 days.

(21) Appl. No.: 09/276,513

(22) Filed: Mar. 25, 1999

(51) Int. Cl.[7] ....................................................... F03C 1/00
(52) U.S. Cl. ............................................... 60/496; 60/495
(58) Field of Search ...................................... 60/495, 496

(56) References Cited

U.S. PATENT DOCUMENTS

| | | | |
|---|---|---|---|
| 4,054,031 | 10/1977 | Johnson | 60/496 |
| 4,498,294 | 2/1985 | Everett | 60/496 |
| 4,981,015 | 1/1991 | Simpson | 60/495 X |
| 5,555,728 | 9/1996 | Welch, Jr. | 60/496 |
| 5,685,147 | 11/1997 | Brassea | 60/495 X |

Primary Examiner—Hoang Nguyen

(57) ABSTRACT

A simple math model was used to estimate the energy requirements of a water vortex generator, followed by another model constructed for fluid mechanical analyses of water surface resistance and friction of a modified buoyancy engine. The final results demonstrated the feasibility of converting the potential energy of buoyancy into kinetic energy using floatation of conveyer mounted airtight containers, through which ultimately free energy can be acquired. Physical reasons were provided for the power saving in the high volume air transport using convergent air/water vortex generators, for which applicable designs were disclosed. Several criteria were identified for the optimum design of air bubble/stream release. To reduce water resistance and friction the generic buoyancy engine was modified by installing flow smoothing skirt panels on the containers to provide smooth continuous surfaces. Thin boundary layer of effervescent bubble filled water with specific gravity less than unity was considered for reducing friction force. An analytic evaluation identified an optimization of width/length ratio for the container configuration. Analyses also showed advantage of high speed engine operation to achieve higher power gain. A conceptual design was explored for a light gross weight mobile buoyancy engine using the entire vessel for water recirculation.

11 Claims, 7 Drawing Sheets

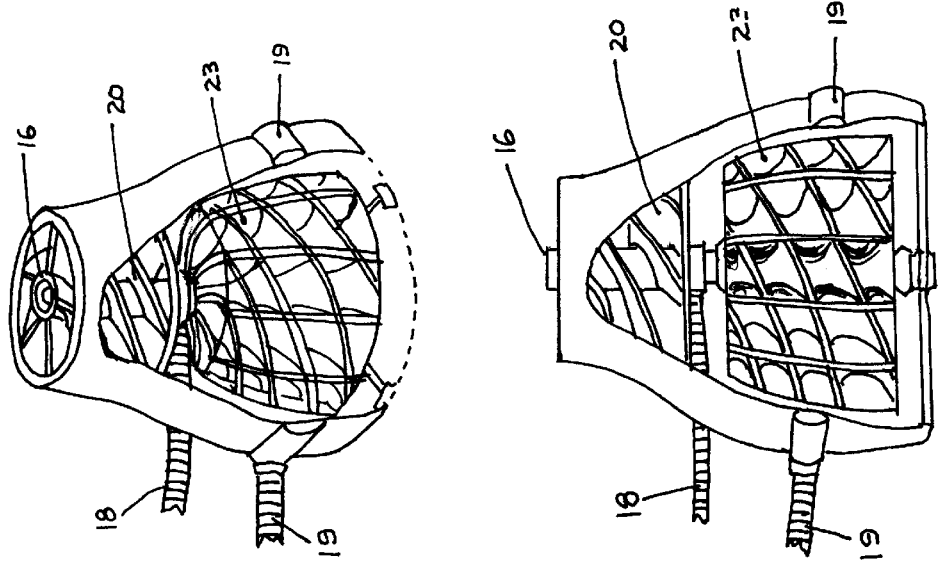
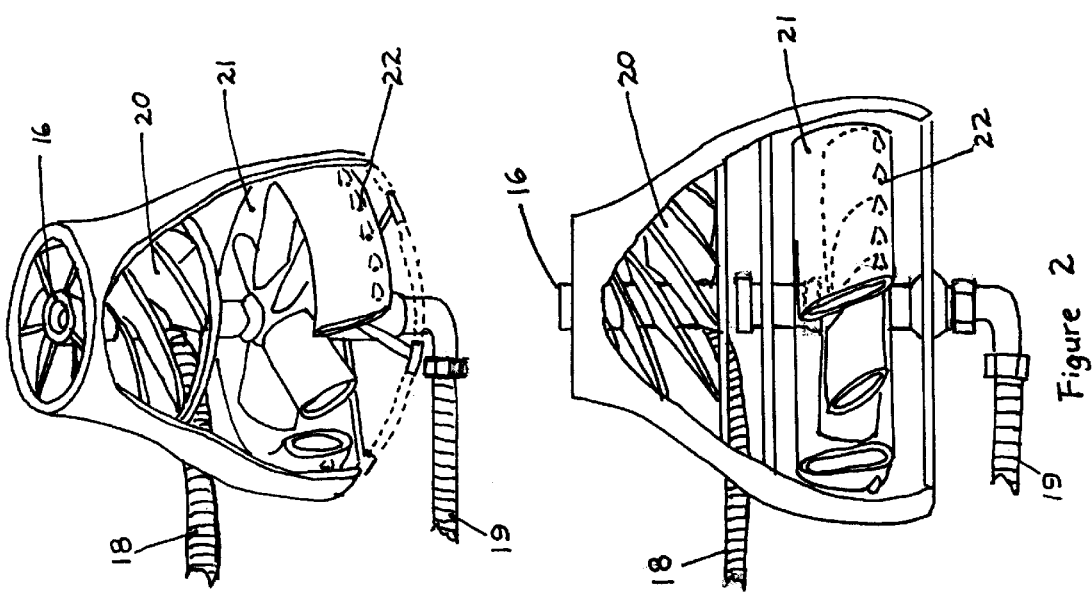

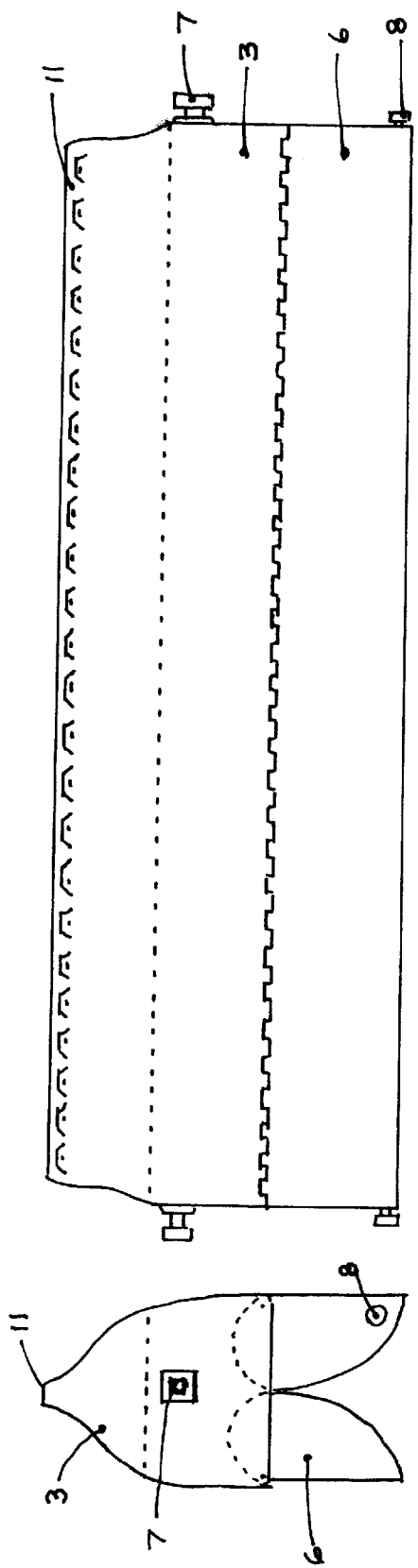
Figure 8
Figure 7
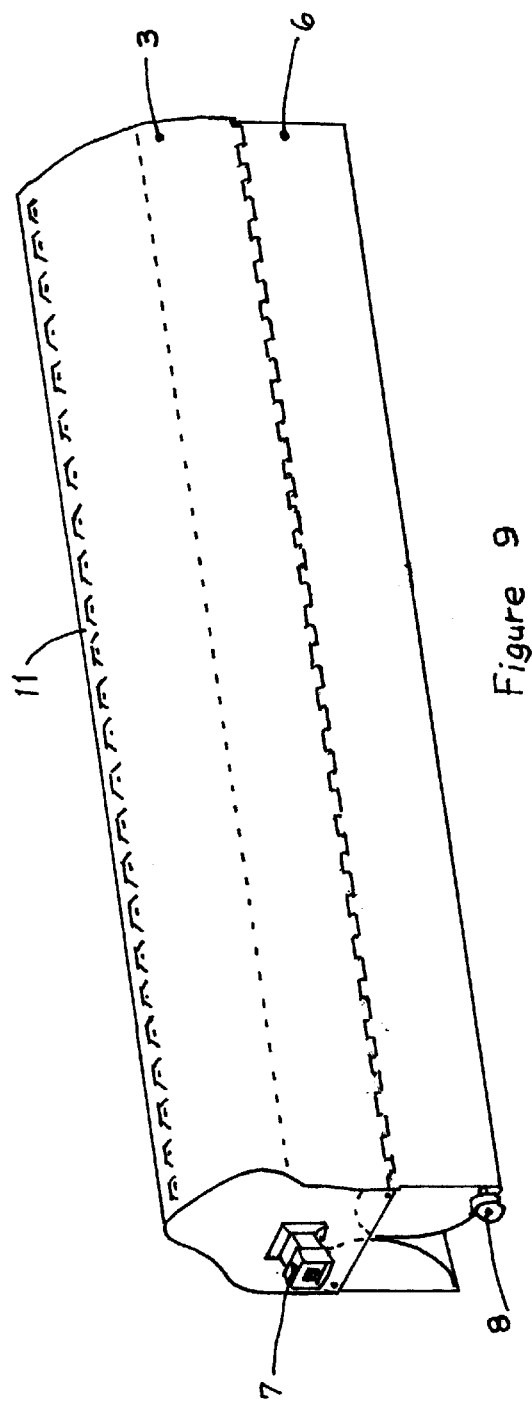
Figure 9

METHODS AND APPARATUS FOR ACQUIRING FREE ENERGY USING BUOYANCY TECHNOLOGY

CROSS REFERENCE TO RELATED APPLICATION

Numerous past U.S. and foreign patents exist for diverse designs of buoyancy engines, most recent of which are U.S. Pat. No. 5,685,147, Brassea, Buoyancy and Thermal Differential Energy Generator, Nov. 11, 1997; U.S. Pat. No. 5,555,728, Welch, Jr., Apparatus and Method for Producing Power Using the Excess Pressure in Natural Gas Pipeline, Sep. 17, 1996; U.S. Pat. No. 4,981,015, Simpson, Buoyancy Engines, Jan. 1, 1991; U.S. Pat. No. 4,742,242, de Shon, Buoyancy Engine Utilizing Linked Lifting Bodies, May 3, 1988; U.S. Pat. No. 4,683,720, De Shon, Buoyancy Engine Utilizing Pistons and Crankshaft, Aug. 4, 1987; U.S. Pat. No. 4,054,031, Johnson, Power Unit, Oct. 18, 1977; and Chinese Republic Patents: CN 110835A, Jin Bai Cheng, Floatation Box Power Machine, Sep. 13, 1995; CN 1102239A, Zhang Chang Ling, Air Floatation Generator, May 3, 1995; and CN 1080365A, Lin Ji Yen, Floatation Power Machine, Jan. 5, 1994. The U.S. patent documents cited above further supply additional references, including the earliest U.S. Pat. No. 233,319, Boerner, October 1880 on record.

BACKGROUND OF THE INVENTION

1. Field of the Invention

All the referenced patents have been granted for the specifications of engine designs, whereas none of them seriously examined the possibility of acquiring free energy by operating such engines. Presently known input-output analysis does not assume output power becoming greater than input power in any thermal, combustion, or electro/mechanical system due to laws of thermodynamics. A generic buoyancy engine is first defined, and its refinements are subsequently identified in this specification. Comprehensive math models are discussed for the first time in this field of application. Potential methods for acquiring free energy, thus boosting output/input power ratio above unity, are discussed in detail.

2. Description of the Prior Art

The basic design concept of Johnson, loc. cit., and Simpson, loc. cit., are used in the following definition. A generic bouyancy engine consists of a plurality of airtight open top, solid box containers (upright to fill water; upside down to fill air) securely mounted on two parallel, vertically positioned, endless (notched, unnotched, bicycle chained, or in combination thereof) conveyer belts, partially submerged in a water column and spanning tightly between conveyer wheels on axles, of which one set is kept dry above the surface and the other submerged at the bottom, whereas buoyancy of the air filled containers floating upward through the water column provides the action of the engine for output power system and the downward moving water filled containers are driven to the bottom for air ingestion.

Various bucket designs, different from the solid box containers, had been considered. In U.S. Pat. No. 4,054,031 Johnson used a plurality of collapsible awning-shaped air buckets, each comprised of two hinged solid panels and flexible ends, fully inflated with air in the ascending column, and collapsed in the descending column. Although the collapsed buckets reduced the exposed area of the descending column, the ascending column showed sawtooth-like discontinuities of surfaces as seen in side way cross section, which induced fluid turbulence and increased the surface resistance and friction in water. The flexible ends allowed the air bucket to collapse, but did not serve for smoothing or modifying water flow. In U.S. Pat. No. 4,498,294, Everett used two distinct types of gas filled buckets, one, solid and incollapsible in ovoid in cross section, and, the other, collapsed in narrow descending column and fully inflated into box shape in ascending column. Both types of buckets fit tightly inside constrictive fluid channels, and were stacked with little spacing inbetween. To make the buckets of the second type collapse at the fluid surface, two curved panels were used to force them into narrow tight spacing and to reconfigure into the collapsed shape. In U.S. Pat. No. 4,981,015 Simpson showed a totally submerged system with tightly stacked air buckets with no spacing inbetween, which opened up and spread out, like the spokes of open hand waving fan, at bottom and at top for air ingestion and discharge. The stacked ascending/descending columns formed continuous surfaces with small indentations between successive buckets. However, the discontinuous surfaces of the open spread out containers at the top and bottom both induced sizable water resistance and frictions. In U.S. Pat. No. 5,685,147 Brassea used sectioned self-contained gas filling chambers with pivoting louver slats, open/close slit vents, and sliding doors, all actuated by hydraulic servo-mechanism managed by local controllers, instead of simple bucket containers. Implementation of such a system was expected to be quite expensive.

In all the referenced patents, air, or gas, was injected into containers in the form of bubbles, not as steady air/gas streams as proposed in this invention. The significance of this difference would become clear shortly. In U.S. Pat. No. 5,685,147, Brassea made use of conventional gas turbine and vortex generating nozzle to capture energy of residual heat in gas at various circulation stages of operating gas. The design concept of this vortex gas expander differed significantly from creation of steady air stream at depth using simultaneous generation of both air and water vortices as proposed in the present invention.

A short discussion of "perpetual machine" must be presented, cf. R. Feynman, et al., Feynman Lectures on Physics, Vol.I, pp.13-4 to 13-5, Addison Wesley, Reading, Mass. 1963. By construction a perpetual machine must operate along a closed circuit without changing its specification. In case of the generic buoyancy engine, the air inside bucket containers must be pushed down from the surface to the bottom, and then allowed to rise in the ascending column. In such a case, the air filled containers on both ascending/descending columns are in perfect balance, and therefore no movement can ever be induced. Such a machine cannot perform any work. An equivalent situation arises if a compressor is used to feed air at the bottom by counteracting the water pressure at the depth. Under ideal conditions the compressor consumes the same amount of energy as pushing the air in containers from the surface to the bottom in the descending column. The actual energy consumed is however expected to be slightly higher than the energy spent in pushing the air from the surface, because of the compressor heat loss, air conduction loss, etc.

Douglas C. Giancoli's Physics for Scientists and Engineers, pp.297–299, 2nd ed., Prentice Hall, Englewood Cliff, N.J. 1989, defines the buoyant force as the one which arises from the fact that the pressure in a fluid increases with depth, and that the upward pressure on the bottom surface of a submerged object is greater than the downward pressure on its top surface. The pressure at depth h for a water density $\rho$ is given by $\rho g h$ where g is the gravitational constant 980 cm/sec$^2$. The buoyant force at depth h becomes equal the weight mg of water mass m of the cylinder; with the given base area at depth h the potential energy of the buoyancy is given by the familiar E=mgh.

SUMMARY OF THE INVENTION

If the water mass M displaced by air in a container from depth h to h-dh satisfies M=N$\mu$, where the average size air bubble displaces water mass $\mu$ for a large N, the potential energy of floatation of the air volume over dh becomes E=Mgh=N$\mu$gh. The energy required in release of the N individual bubbles displacing water mass N$\mu$=M then becomes identical with the potential energy of floatation, and therefore no free energy can be acquired. This is the equivalent of Feynman's perpetual machine. Note however that, if steady air streams (or air jets) can be generated, the water pressure at depth would act in the same manner as the spring loaded pressure relief valve works. As explained below, steady air streams can be produced using convergent air/water vortex generators, and a high volume of air can be transported with a relatively small amount of additionally consumed energy. This is the basic principle to be exploited in the acquisition of free energy through operation of a radically modified form of the generic buoyancy engine. No principle of thermodynamics is violated. The modified buoyancy engine neither uses nor generates heat and operates at ambient temperature. The energy required in generation of steady air stream and air injection is found less than that required in air bubbling.

The present specification differs significantly from the previously patented engine designs in incorporation of model analyses, and identifies methods for modification and improvement applicable to buoyancy engines; (i) design specifications for the required air stream using air/water vortex generators, (ii) installation of the flow smoothing skirt panels attached to all the containers, (iii) use of fine air bubble effervescent water at the boundary layer to reduce surface friction of the moving segments, and (iv) optimization of the container configuration in its shape through reduction of the side surface area to the volume ratio of the submerged section.

Air Stream vs. Air Bubbles

If a volume of air is released at depth, a burst of bubbles is always formed due to surface tension of the air-water interface. To generate a steady air stream the body of water surrounding each volume of outgoing air from a nozzle must be in a whirl motion forming a strong vortex. To assist the persistence of the water vortices, air pushed out from the nozzles must also be put in swirl motion along the same direction. If air bubbles are trapped inside a water vortex, they are all squeezed and become elongated with thin membranes separating them easily ruptured, thus forcing the trapped air to form a continuous stream.

It is easy to see the technical feasibility of obtaining steady air stream using water vortex generator without prototype development. In chemical experiments a liquid in a beaker is agitated using a rotating magnet placed at the bottom activated by another rotating magnet underneath. When a high speed swirl is generated, the vortex produces a hollow funnel of air space coming down toward the bottom like an inverted tornado. The air stream generator under consideration is the same but the funnel works upward as seen in actual tornadoes. With the buoyancy of the trapped air, the funnel moves naturally upward, forms a short stream, and then disappears. A steady air stream can be obtained by sustaining air supply. To minimize energy consumption the extent of water in vortex motion must be confined to a minimum by installing appropriate sheath or a concentrator tubing around each set of the water vortex generator and air vortex nozzle, and also by positioning each vortex generator as close as possible to the air space of the containers. An obvious choice must be made for the handedness of the vortex generators. For operations in the northern hemisphere, the generated vortices should be left-handed to exploit Coriolis force effect, and similarly right-handed in the southern hemisphere.

Water Vortex Generator

Many different water vortex generators can easily be found. Obvious candidates are a rotating paddle wheel, the reverse use of a centrifugal water pump, or the compressor section of a bypass jet engine, each of which can be driven either by the external power of the conveyer belt system, or by pressurized water jets blasting on peripheral surfaces of the body from outer housings. These devices need large size inlet openings and sets of suitable guide vanes for the output vortex.

Two other design concepts are introduced below. In the first a suitably designed assembly of spiral air/water conduit tubes can be used. Bubbles blown into them glide upward to float following the spiral. Their motion induces nearby water molecules to move along with them by adhesion due to the air-water surface tension. The diameter of each spiral tube can sequentially be reduced to induce a stronger swirl motion at the output. A plurality of such spiral conduits of decreasing cross section area is assembled in multiple layers. The entire assembly can also be rotated using external power of the conveyer belt system. Individual bubbles ejected from the conduits will easily be absorbed into the central air stream for the lesser amount of energy required in this transition rather than staying inside swirling water due to the Principle of Least Action.

As another possible design, prepare a watertight free rotating wheel with hollow spokes each with a cross section of a guide vane mounted on water pipe at the hub with bushings, having high pressure water jets released from chosen sides of the spokes, as well as from tangential exit orifices on the wheel. Multiple wheels may be stacked on the central pressurized water pipe. The wheel can also be replaced by a corkscrew shaped hollow solid with paddles installed between threads to push water, which has tangential high pressure water jet ejection orifices placed at the edges or at the bottom. However, in both cases the water jet can instead be blown from the outside housing, e.g., towards fins installed on the wheel or paddles on the spiral body, eliminating the problematic wear of the bushings and bearings of the high pressure water pipe.

In all the above identified apparatus optimization may be sought for the choice of the rotation speed and for the pitch of the critical components, i.e., the paddles, the guide vanes and the disk blades, spiral conduits, spokes, spiral body, to attain a highest possible proficiency in water vortex generation. The effort can be supplemented by computer simulations, math modeling, prototype development, and/or experimental verifications of critical components.

There is a totally different design concept worthwhile for consideration. Since the buoyancy engine must have the container units and the belt conveyer system all in continuous motion, the surrounding water can also be moved rapidly along with them in recirculation. Appropriate guide vanes and wall inserts can be mounted on the vessel side walls to produce individual swirling water channels, leading to water vortex generators. To recirculate water rapidly along with the moving conveyer belt system, the vessel sidewalls and the inserts must be positioned very close to the units in motion. The design reduces total volume of water contained in the vessel to a minimum resulting in a lesser total gross weight, suitable for mobile power generation units. Note that the water resistance and friction of the water in continuous motion have to be evaluated on both the container units as well as on the side walls of the vessel as a whole. The actual fluid mechanical problem becomes intractably complicated for model analysis, and must be left for future investigations.

A Rought Estimate

Detailed math model development of air/water vortex generators becomes quite laborious and complicated. Different designs call for different model analyses. However, a rough estimate can still be made using a simple model approximation. Since every water vortex generator involves rotation of a volume of water about the vortex axis, and since air must be released through the same central axis, a cylinder with its axial core taken out can be a good approximation of the water in rotation. Let dV denote the volume of the loop of radius r, thickness dr, and height h. Then $dV=2\pi$ hrdr. The moment of inertia is $I=\int_a^b r^2 dV = \int 2\pi \; hr^3 dr = 2\pi \; hr^4/4|_a^b$ integrated over all these loops from the inner radius $a=r_1$ to the outer radius $b=r_2$ of the cylinder, finally leading to $I=M(r_1^2+r_2^2)$ where M is the water mass of the cylinder with the core missing. If the water volume rotates at angular velocity $\omega$, the kinetic energy is given by $I\omega^2/2$. If the water volume moves linearly upward at velocity v, then the kinetic energy of $Mv^2/2$ must be added. For details, cf. pp.228–229, pp.238–239, D. C. Giacoli, loc. cit.

Suppose the air pipe/nozzle area is 100 cm² with the inner radius 5.64 cm, while the outer radius is given parametrically as r=10 cm, 15 cm, or 20 cm, and the height is 300 cm. For a given angular velocity of $\omega=10\pi$/sec (5 rev/sec), the kinetic energy is 20.9 J, 129.3 J, and 369.1 J respectively for r=10, 15, 20 cm. When the angular velocity is doubled to $\omega=20\pi$/sec (10 rev/sec) 83.5J, 517.2J, and 1476.5J are obtained. To move the same volume of water at 1 m/sec linearly upward, 32.1J, 90.9J, and 173.4J are required. At the linear velocity of 5 m/sec, the kinetic energy requirement increases to 802.5J, 2272.5J, and 4335.0J respectively. This finding supports a recommendation that the water vortex generator must push water only at a low linear velocity, but concentrate in generation of swirl motion. The worst case combination of $\omega=20\pi$/sec, r=20 cm, and 5 m/sec linear movement produces the kinetic energy requirement of 5811J which is still less than most cases of the free energy acquisition as later calculated in the two illustrative Examples 1&2. In summary this crude assessment gives a tentative indication that the energy consumption of a water vortex generator is mostly less than the free energy which can be acquired through the operation of the buoyancy engine making use of air/water vortices.

Design Criteria for the Air Release

Air bubbling is still used in the modified engine. Since the potential energy of a bubble displacing water mass $\mu$ is $\mu gh$, i.e., the required energy for releasing the bubble at depth h, least energy is expended by choosing a small value of the $\mu$. This can be accomplished by using a small size diameter orifice on each air output hole as allowable without clogging. Each air bubbling orifice must be formed in the shape of a perforated cone extrusion to reduce the surface tension of bubbles adhering to its surrounding surface area. Secondly the direction of the bubble release must be taken into consideration. If each bubble is released in a direction with a deviation angle $\theta$ from the vertical, then the amount of energy $\mu gh \tan \theta$ is transferred to the horizontal velocity component of the bubble movement and possibly wasted unless positively utilized. When air streams in vortex move upward, the density of the water column above is reduced, thus inducing convection currents, which in turn assist water ingestion into the water vortex generator, making the power requirement even smaller. Lastly the air nozzles must be positioned at the shallowest possible position, because its depth h from the water surface determines the potential energy $\mu gh$ required for the air release, and the distance between each nozzle and the air space in the container must be kept also at a minimum to avoid disruption of steady air streams due to turbulent water currents. As a well known side remark the air pipe leading to the nozzles must avoid sharp turns and bends to reduce air conduction losses.

Conversion of Potential Energy into Kinetic Energy

If the potential energy, mgh, can totally be converted into kinetic energy $(\frac{1}{2})mv^2$, a velocity of $v=\sqrt{(2gh)}$ should hypothetically be achievable in absence of water resistance and friction and mechanical energy loss. However, since the air filling must occur while the units are moving along the endless conveyer belts, they may for instance be completely filled to the full capacity at half way up or only near the top surface as seen in the design of CN1080365A. In the latter case the effective depth is reduced to h/2, and the achievable speed of the buyoyancy engine becomes equal $\sqrt{gh}$. The actual operation speed is of course determined by the load placed on the power output system of the conveyer belts.

Flow Smoothing Skirt Panels

In the modified buoyancy engines, the bucket containers mounted on the conveyer belts incorporate appropriately designed skirt panels to close the gaps inbetween and form continuous smooth surfaces along water flow to avoid exposure of frontal surfaces, which are known to produce most detrimental water resistance. Note that the skirt panels mounted with hinges on edges of each container automatically remain closed due to the pressure of water flow against them. The skirt panels are forced open using guide rails/follower guide wheel combination for ingestion of water at the surface on the downward moving conveyer belt, and for air injection at the bottom. The skirt panels also help to ingest air into the containers without spilling much of it outside. The submerged portion of the conveyer mounted units consequently will have an appearance of segmented and jointed sections of a modern high speed train with the open gaps covered except at the locations where the skirt panels are forced open. The containers and the skirt panels can safely be made of fiber glass, thermal plastic, carbon fiber composite, or as a composite in combinations. No metal skin containers or skirts are required, because no heat is involved in the operation of the apparatus. When metal containers and skirts are used for strength, the surfaces can be coated with layers of plastic or other inexpensive coating materials.

In the design of using the entire vessel for water recirculation and vortex generation, the flow smoothing skirt panels are eliminated to maintain vortex motion in separate channels of recirculating water. The discontinuous surfaces can then induce movement of adjacent volume of water along the motion of the conveyer belts. The surface discontinuity becomes less important, because the relative speed of water flowing against the moving bucket containers becomes small in this design.

Fluid Mechanical Analysis

A well known software of computational fluid dynamics (CFD) is available. Instead, the following analysis uses a simplified physical configuration of the submerged section of the engine for which a well known method of model analysis can be applied in a manner familiar to students of fluid mechanics. The submerged section of the conveyer mounted units may be represented by an U-shaped solid, because they can now have continuous surfaces by installing the flow smoothing skirt panels. The friction caused by water flowing along its surface can be approximated by the one on a flat plate of the same length and area in substitution. The following method of calculation is quoted from pp. 439–448 of Fox, R. W. & A. T. McDonald, Introduction to Fluid Mechanics, 4th ed., Wiley, N.Y. 1992. For the conveyer mounted units of total length L moving at speed V, a Reynolds number $$Re=VL/\nu \tag{1}$$

is obtained where the kinetic viscosity is given by $\nu \approx 10^{-6}$ for water at 20° C. The drag coefficient of the friction is given by an empirical formula of $$C_D=4.455(\log Re)^{-2.58}-1610/Re \tag{2}$$

for $5 \times 10^5 < Re < 10^9$ as applicable in the present case. The friction force is then given by the well known formula of $$F_D=C_D A \rho V^2/2 \tag{3}$$

where A is the surface area and $\rho$ is the weight of water per volume.

Numerical evaluation was carried out on two examples to determine the feasibility of the proposed analysis. In the first example of a conceptual design, dimensions are specified in metric for the ease of computation. In the second example of shoe box shaped containers, dimensions are specified in English units instead. The power required for the air transport with air/water vortex generators is not included in the evaluation, because the design parameters heavily depend on individual configurations. Similarly the water resistance and friction of the submerged conveyer system, belts, wheels, and axle, are not included.

EXAMPLE 1

A vertically positioned U-shaped solid, with the straight segments 7 m (23 ft) in depth and 3 m (10 ft) in radius along the middle line at the turning portion of the U with an uniform square cross section of 1 m² (11 ft²) was examined as the typical submerged section of a conceptual system. The equation of $\sqrt{gh}$ for h=10 m yields a nominal speed of 9.9 m/sec. Three different nominal operating speeds of 10 m/sec, 5 m/sec, and 2 m/sec (33 ft/sec, 16 ft/sec, and 6.6 ft/sec) were designated for examination. The middle line length along the curved U-shape is 23.4 m (76 ft), and the total surface area of the solid is 93.7 m² (1008 ft²). Reynolds numbers are $2.34 \times 10^8$, $1.17 \times 10^8$, and $0.468 \times 10^8$ respectively using (1). The drag coefficients are 0.0018876, 0.00200847, and 0.00233808 using (2), and the corresponding water frictions are given as 8842N, 2352N, and 438N (1988 lbf, 529 lbf, and 98.4 lbf) respectively using (3). If on average three and half containers of capacity 1 m³ (35.5 ft³) each are air filled and operate over an effective depth of 5 m (16 ft), the kinetic energy of the conveyer belt system at the specified operating speeds over 5 m should yield 35000N, 8750N, and 1400N (7869 lbf, 1967 lbf, and 315 lbf) of force respectively. The calculated water friction losses are respectively figured out to be 25.3%, 26.9%, and 31.3% of the operating kinetic energy output. The conceptual engine can then respectively yield 131 kW, 32 kW, and 4.8 kW per second of free power output. When the friction adjusted forces are tangentially applied to the wheel of radius 3 m (10 ft) of the conveyer belt system, 78,474 Nm, 19,194 Nm, and 2,886 Nm (57,879 lbf ft, 14,157 lbf ft, and 2,129 lbf ft) of torque are respectively generated.

The typical computation is demonstrated for the case of 10 m/sec: From (1) $Re=VL/\nu=(10 \text{ m/sec})(0.23.4 \text{ m})/(10^{-6})=2.34 \times 10^8$ is obtained. From (2) $C_D=(0.455)(\log Re)^{-2.58}-1610/Re=(0.455)(8.3692)^{-2.58}-1610/2.34 \times 10^8 = 1.8945 \times 10^{-3} - 6.88 \times 10^{-6} = 0.001887$. The friction force is $F_D=C_D A \rho V^2/2 = (0.0018876)(93.68 \text{ m}^2)(1000 \text{ kg/m}^3)(100 \text{ m}^2/\text{sec}^2)/2 = 8842N$. The kinetic energy of 3,500 kg of water mass moving at 10 m/sec is given by $E=mV^2/2=(3,500 \text{ kg})(100 \text{ m}^2/\text{sec}^2)/2=175,000J$. When this amount of energy is operating over 5 m effective depth, 175,000J/5 m=35,000N (7,869 lbf) of force is generated. The friction loss of 8,842N is 25.3% of this force. After deducting the friction loss, the net force gain of 26,158N=35,000N−8,842N and 130,790J=(26,158N)(5 m) or 131 kW=130,790J/sec of free power gain are respectively derived. The amount of torque generated by applying the friction adjusted force tangentially on the 3 m radius wheel of the conveyer system is given by (26,158N)(3 m)=78,474 Nm (57,879 lbf ft).

EXAMPLE 2

A similar U-shaped solid with the straight segment of depth 26 ft (7.9 m), width 5 ft (1.5 m), length 25 ft (7.6 m), and the middle curve radius of 8 ft (2.4 m) at the U with containers of shoe box shape in size 5 ft×5 ft×25 ft (1.5 m×1.5 m×7.6 m) was examined using the same operating speed assignment of 32.8 ft/sec, 16.4 ft/sec, and 6.6 ft/sec (10 m/sec, 5 m/sec, and 2 m/sec) as specified in Example 1. The middle line length along the curved U-shape is 77.1 ft (23.5 m), and the total surface area of the solid is 4,627 ft² (429.8 m²). Reynolds numbers are $2.351 \times 10^8$, $1.176 \times 10^8$, and $0.4702 \times 10^8$, and the drag coefficients are 0.0018864, 0.0020670, and 0.00233662 respectively; both sets almost exactly identical with those previously obtained in Example 1. The surface friction forces are 9,115 lbf, 2,497 lbf, and 452 lbf (40,543N, 11,106N, and 2,008N) respectively. If five containers are all air filled on the average and move upward over an effective depth of 16 ft (5 m), 198,943 lbf, 49,736 lbf, and 7,958 lbf (884,900N, 221,225N, and 35,396N) of forces are generated. The friction then turns out to be 4.6%, 5.0%, and 5.7% of the output force respectively, considerably less than the corresponding values previously obtained in Example 1. This hypothetical apparatus can respectively yield 4.2 MW, 1.0 MW, and 167 kW per second of free kinetic energy output. When the friction adjusted forces are tangentially applied on the 8 ft (2.4 m) radius wheel, 1.518 Mlbf ft, 378 klbf ft, and 60 klbf ft (2.059 MNm, 512 kNm, and 81 kNm) of torque can respectively be produced.

Optimization of the Container Shape

The appreciable percentage reduction of friction in Example 2 compared to Example 1 can be explained by the following. The ratio of the water friction $F_D$ to the force E/H generated by the kinetic energy $E=(\frac{1}{2})MV^2$, where M is the total mass of the displaced water by air in containers moving upward at speed V acting over an effective depth of H is given by $$F_D/(E/H)=C_D \rho HA/M \tag{4}$$

indicating that the area to the mass ratio, A/M, plays an important role in design when other parameters are kept nearly identical. Since $\rho=1$, the displaced water mass M is equated to its volume. The A/M ratio is then 26.76 m⁻¹ in Example 1 compared to 4.86 m⁻¹ in metric in Example 2. The reduction of A/M can be achieved in two steps, first by reducing A/M' and subsequently by reducing M'/M, where M' is the volume of the U-shaped solid representing the submerged section of the conveyer mounted units.

For the reduction of A/M' a simplified model analysis can be used for evaluation of the design configuration. When the flow smoothing skirts are used, only the side surfaces are exposed to water to cause friction. A cube of unit length on each edge has four sides of square unit surface area each against its unit volume. Compared to this, a shoe box shape consisting of N such cubes connected lengthwise together has the total side surface area of 2N+2 against its N unit volume. The side surface area to the volume ratios of the respective containers are 4 and 2+(2/N). For example, N=5 for the shoe box shape of Example 2, the ratio A/M' reduces from 4 of Example 1 to 2.4. For N=6 A/M' further reduces to 2.33. For such a large N, the structural strength of the shoe box shaped containers must be taken into consideration. A lengthwise keel with ribs may be added on each container. Similarly an analogous analysis can be applied in general to any U-shaped solids with arbitrary cross sections. Note that Example 1 has a A/M' ratio of 4.0 $m^{-1}$ compared to 1.57 $m^{-1}$ of Example 2 in metric. In the second step of the A/M reduction, the value of M was increased from three and half containers full of water mass of 3500 kg (7716 lb) in Example 1 to five containers full of water mass of 88490 kg (195087 lb) in Example 2. The ratios of M'/M are 6.69 and 3.09 for Examples 1 and 2 respectively. The above analysis clearly shows that an optimization can be achieved in selection of the shape of the bucket containers and of the effective number of air carrying containers in ascending movement.

Effect of the Variables

The role of the variable H is described as follows. If possible, the air is fed into the containers promptly as much as practical close to full capacity at the bottom depth of the conveyer system, thus carrying completely air filled units close to the entire depth of H=h up to the surface. This may require a slow operating speed to the detriment of a desired high speed operation, while the actual operating speed depends on the capacity of air compressors in use and on the mechanical load placed on the power output system. In general theoretical power output is always proportional to H for a fixed power input required in operating convergent air/water vortex generators. This fact leads to output/input power ratio potentially becoming greater than unity against current knowledge.

Although the assigned operating speed V does not appear in (4), it plays an implicit role via Reynolds number of (1). Both Examples 1 and 2 clearly show that a higher percentage energy output can be obtained by operating the apparatus at the highest possible speed.

Use of Effervescent Air Layer to Reduce Water Friction

A reduction of the water friction can further be accomplished by decreasing the density $\rho$ in Eq.(3) at the boundary layer. A small portion of air shall be diverted to generate very fine air bubbles which are blown against the skin of the vertically moving segment, thus covering the surface with effervescent water of a $\rho$ substantially smaller than the standard water density of $\rho=1$ at the boundary layer. Since too many parameters enter into this problem, no quantification of the achievable improvement can be made except referring to the equation (3). Note by the way that actual experiments may indicate that the application of this technique to the ascending air filled units can be found not equally desirable as the case applied to the descending water filled units, because the generated potential energy MgH may somehow become influenced and reduced due to the smaller $\rho$ of the boundary layer than the intended value of $\rho=1$. Experimental verifications and refinement of the procedure are both required.

Recently water friction reducing surface treatment has become available for swimwear fabrics. When the same is applied, the performance of the apparatus can be improved.

Preliminary Findings

It is difficult to make predictions without pertinent data on the energy requirements of the air/water vortex generators, the air and pressurized water feeding systems, etc. However, a rough estimate can still be made. If all other applicable energy losses due to as yet unaccounted causes, i.e., for heat, friction of the buoyancy engine, the deficiencies of the oversimplified models as seen in increased water friction due to opened skirt panels for water and air ingestion, unspecified energy consumption of the chosen water vortex generators and air/pressurized water feeding systems, etc., are taken into consideration, it does not seem unrealistic to propose a final 30–50% output from the friction adjusted free kinetic energy output in most of the analyzed cases. The previous estimate of 1 MW per second of free power gain or 500 kNm of torque at 5 m/sec operating speed in Example 2 may at 30% be reduced to 300 kW per second and 150 kNm. Note however that the figures do not reflect the possible friction reduction due to use of the effervescent water at the boundary layer.

In conclusion the above preliminary analysis has clearly demonstrated the feasibility of the method for the intended purposes and the design of the modified buoyancy engines with air/water vortex generators, which should obtain end result gain of free energy. Two methods were identified for reducing water resistance and friction of the generic engine. And a method was introduced for optimization of the surface area to the volume ratio demonstrating a design advantage of long shoe box shaped container design. Applicable designs to water vortex generators and modified forms of the buoyancy engines were introduced for design consideration.

OBJECT OF THE INVENTION

The principal object of the invention is to formulate and identify methods for achieving a high performance in air transportation and ingestion, for reducing the surface resistance and friction, and for optimizing the design of an efficient buoyancy engine, which converts the potential energy of buoyancy into kinetic energy for the purpose of acquiring free energy. Note that in the past only mechanical design features of such engines have been specified in patents, but never with detailed exposition of math analysis. The prescribed methods identify the potential merit of the buoyancy technology not explored before.

Another object of this invention is to improve the performance of the buoyancy engines presently in approved patents by modifying design configurations according to the findings of the present specification. All the currently patented engines with containers having exposed frontal areas and discontinuous side surfaces get very substantial amounts of water resistance and friction. They all use the energy consuming air bubbling techniques. As the result the purpose of acquiring free energy, if so intended, seems to have been defeated at the outset.

The most important object is environmental in providing an energy conserving and energy gaining power source for electric power generators (i) to meet future power requirements without consuming natural resources, (ii) to eliminate carbon dioxide emission into the atmosphere due to use of coal, oil, or natural gas at power generating stations, and (iii) to eliminate nuclear waste products from nuclear power generation units. Unlike wind power generators, the power output of the modified buoyancy engine is time invariant, and therefore much preferred in power grid applications.

As a sequel, the engine can also be used in mobile electric power generation units, which can be installed on transportation vehicles or vessels, such as locomotives, surface ships, and submarines, to drive propulsion systems without consuming fuels.

BRIEF DESCRIPTION OF THE DRAWINGS

The foregoing and other objectives will become more readily apparent by referring to the following detailed description and the appended drawings in which:

FIG. 2 is a perspective view and a side view of a conceptual design for the rotating wheel convergent air/water vortex generator.

FIG. 3 is a perspective view and side view of a conceptual design of a spiral shaped body convergent air/water vortex generator.

FIG. 7 is a front view of a shoe box shaped container designed for the modified buoyancy engine with the water flow smoothing skirt panels attached.

FIG. 8 is an end view of the same shoe box shaped container.

FIG. 9 is a perspective view of the same shoe box shaped container.

DESCRIPTION OF THE PREFERRED EMBODIMENTS

Figure 1:
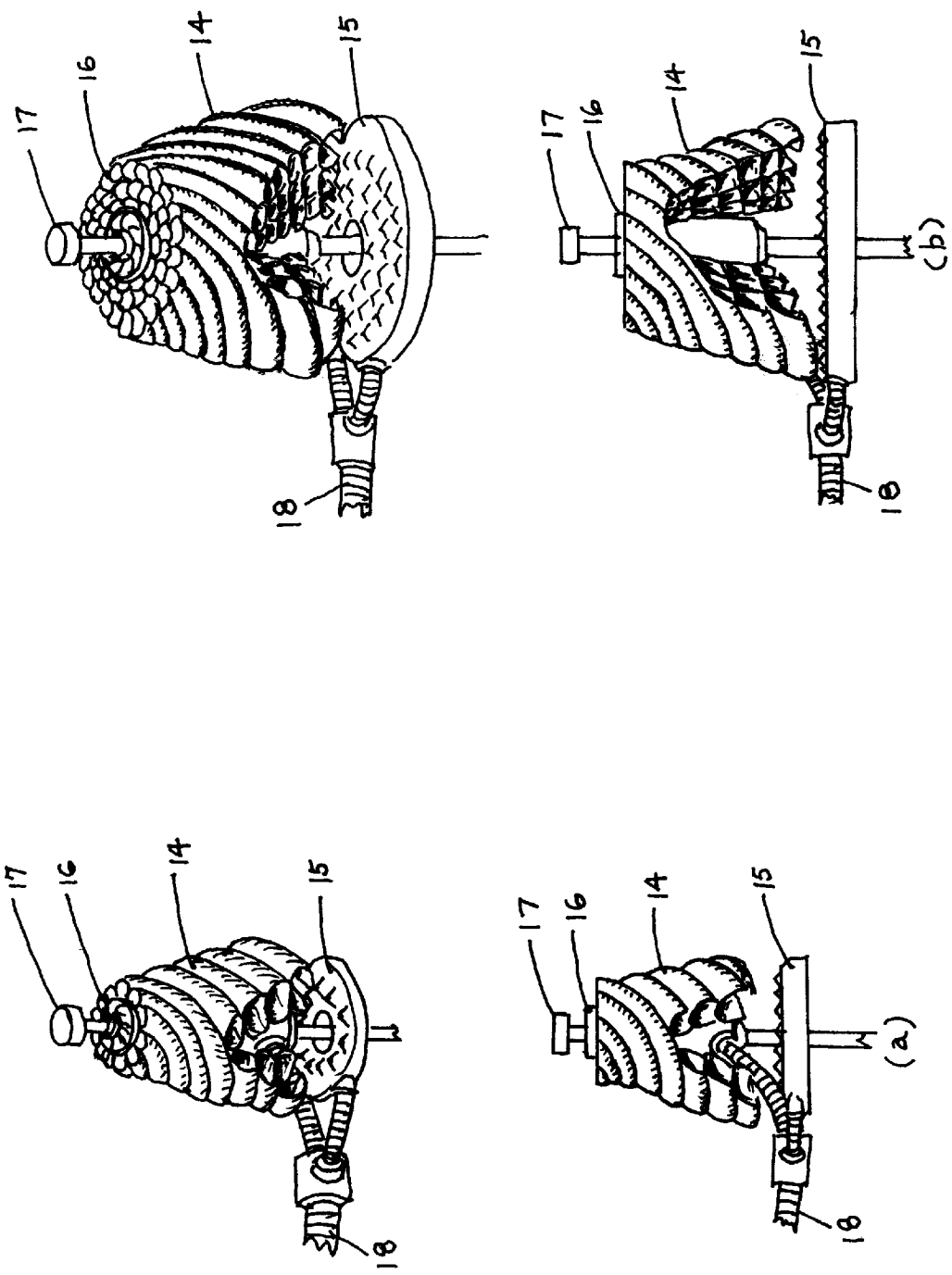
FIG. 1 is a perspective view and a side view of a conceptual design for the spiral conduit convergent air/water vortex generator.

A conceptual outline of potential designs for the convergent air/water vortex generators is presented in FIGS. 1–3. The assembly of spiral air/water conduits 14 is shown in FIG. 1 with air blown in from the air blower 15 to produce water vortex with output surrounding the air vortex exit orifice 16, into which air is fed separately from the high pressure air pipe 18. The assembly can further be rotated about its axis 17 through use of power supplied from external source. FIG. 1(a) shows a single layer design, and 1(b) shows three layer design respectively.

FIG. 2 shows a rotating wheel water vortex generator powered by high pressure water fed through the pipe 19, with the generated water vortex exiting through the guide vanes 20. The compressor wheel 21 is rotated by the water jet coming out of the tangential orifices 22. FIG. 3 shows the rotating spiral body 23 with paddles installed between threads for water vortex generation, powered by the high pressure water jet blown against the paddles of the spiral body 23 tangentially from the jet nozzles mounted on the inside wall of the outer housing, not shown, fed from the high pressure water pipe 19.

Figure 4:
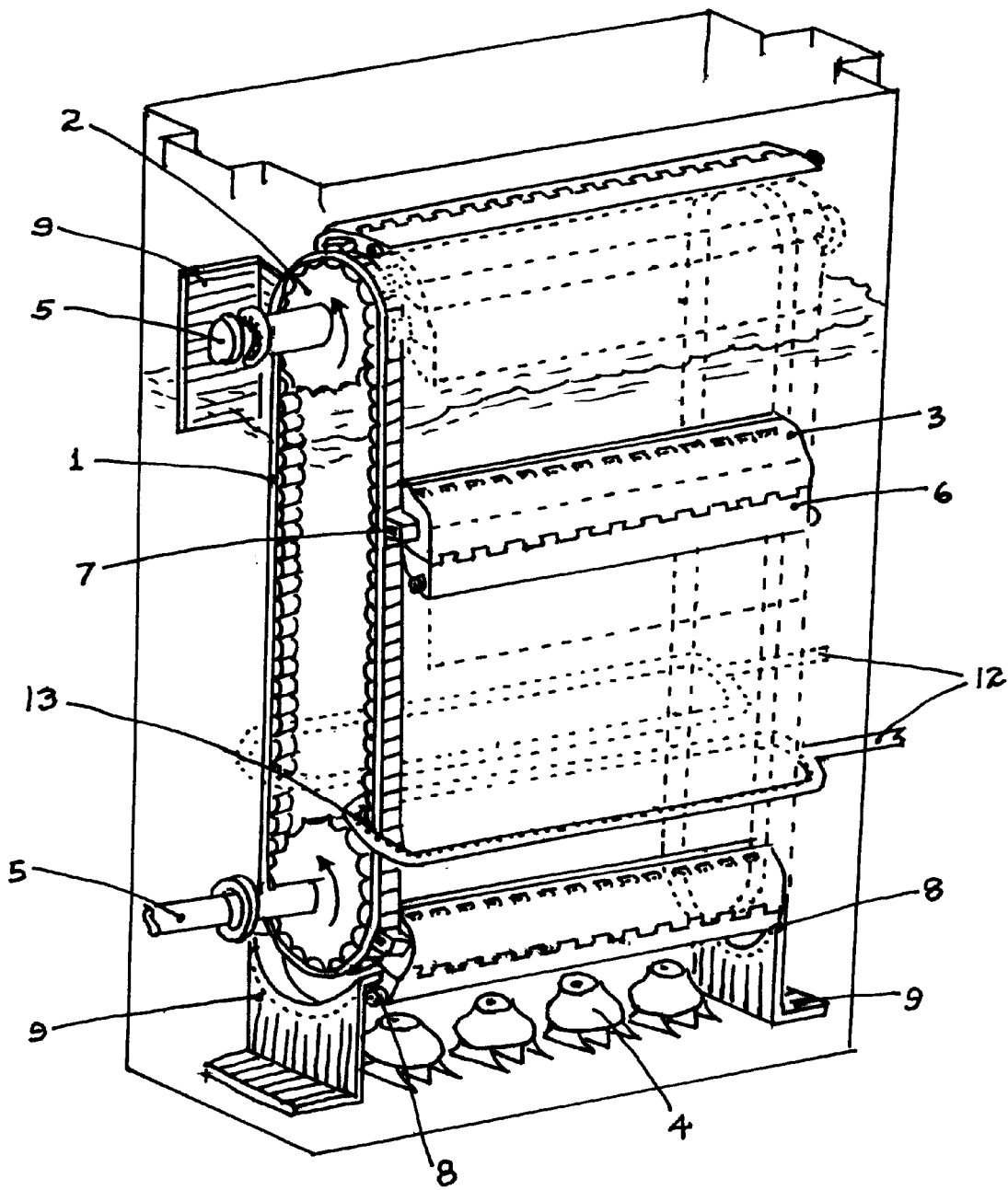
FIG. 4 is a perspective view of a possible design configuration of the modified buoyancy engine with shoe box shaped containers, each having flow smoothing skirt panels installed, which are forced open at top and bottom to ingest water and air respectively using the combination of guide rails and follower guide wheels inside water column of a closed vessel, at bottom of which a set of convergent air/water vortex generators is installed, and having the vertical moving columns surrounded by air bubble discharge units which generate thin effervescent water layers.
Figure 6:
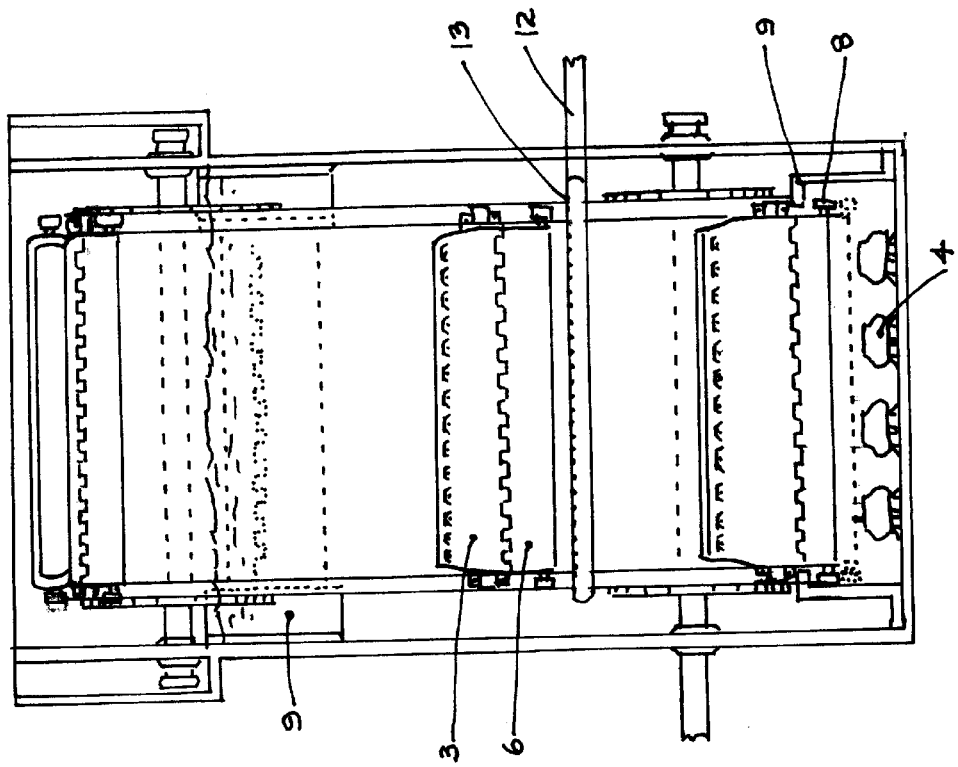
FIG. 6 is a front view of the same modified buoyancy engine.
Figure 5:
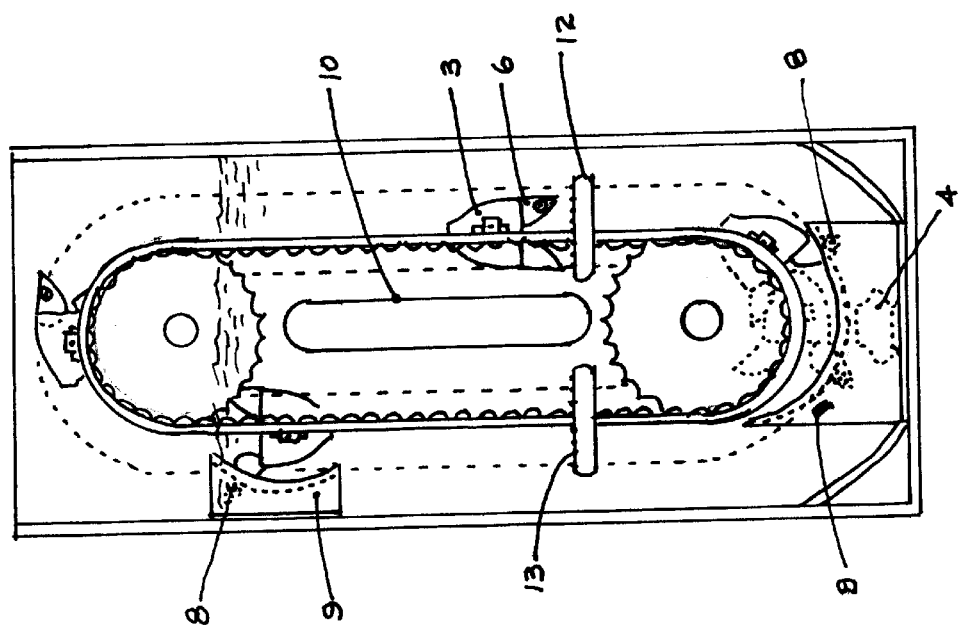
FIG. 5 is an end view of the same modified buoyancy engine.

FIGS. 4 through 6 show a conceptual design of the modified buoyancy engine with the two vertically positioned endless conveyer belts 1, spanning tightly between the wheels 2, onto which shoe box shaped containers 3 are securely mounted, and air is filled into the containers from the convergent air/water vortex generators 4. The two horizontal axles 5 are mounted on the vessel walls with roller bearings and watertight seals, with the lower axle shaft at fixed position extended outside the vessel wall for power output applications, and the upper axle position on the vessel walls made adjustable for height to tighten slacks of the conveyer belt loops. The entire conveyer system is housed inside the water vessel.

As shown in FIGS. 4–6 each container has conformal skirt panels 6 attached with hinges at the lengthwise edges to avoid frontal surface exposure and reducing water friction. The supports 7 are used to securely mount each container on the conveyer belt. In order to reduce the friction force acting on them, the long shoe box shape was chosen as seen in FIGS. 7–9. Air is injected at the bottom depth by opening the skirt panels using the guide wheels 8 mounted at the edges led along the guide rail 9 as shown in FIG. 5. The flow adjusting baffle 10 separates eddy currents of the opposite flow directions in the middle as indicated in FIG. 5. The top keel 11 with ribs in FIGS. 7–9 gives structural strength enhancement of the long shoe box shaped container.

Figure 10:
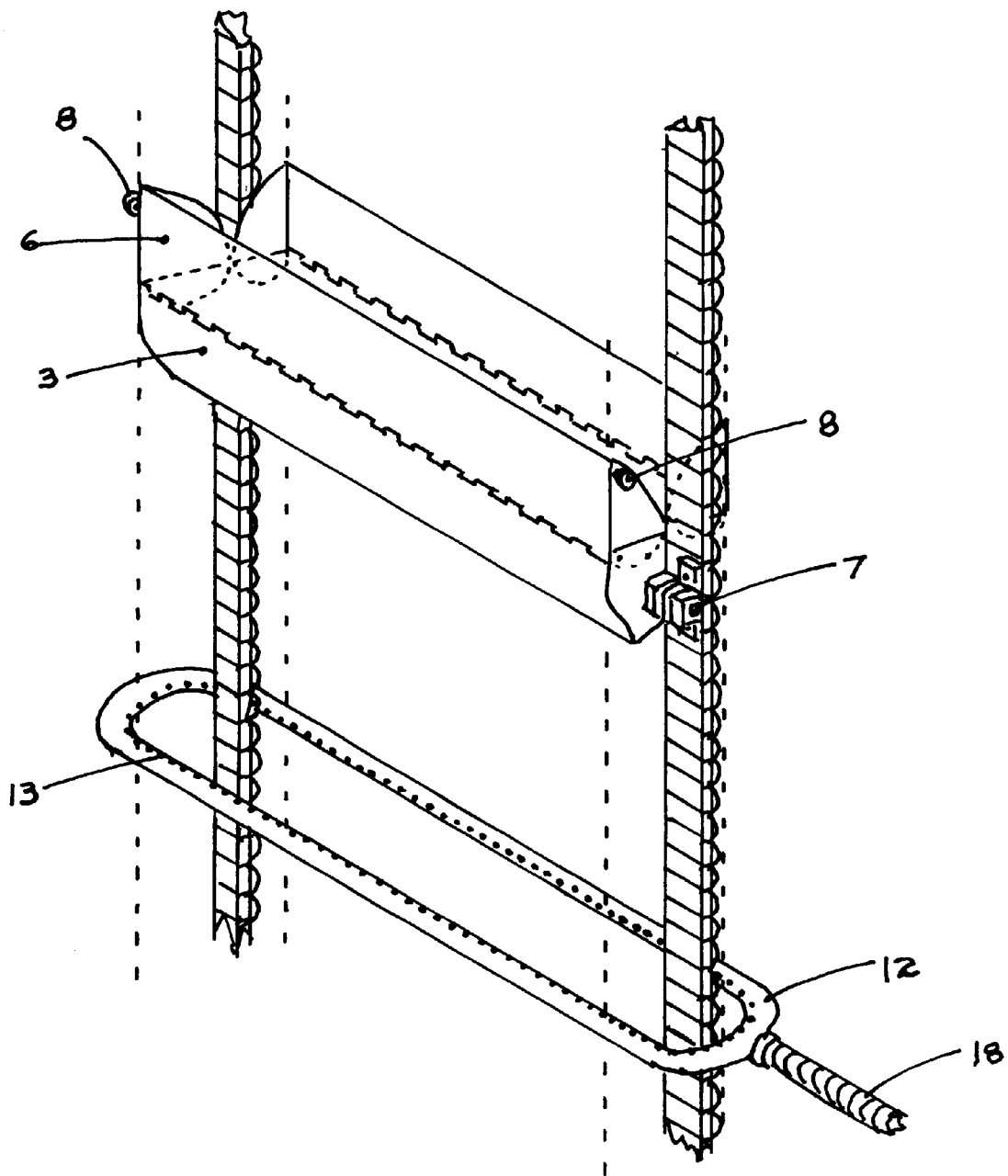
FIG. 10 is a conceptual drawing of blowing fine air bubbles against the walls and skirt panels of the containers to reduce water friction at the boundary layer.

A conceptual outline of blowing fine air bubbles against the walls and skirt panels of the containers to generate a boundary layer of a lower $\rho$ appears in FIG. 10 with the air feeding pipe 12 leading to multiplicity of air ejection orifices 13 of a small size aperture.

Figure 11:
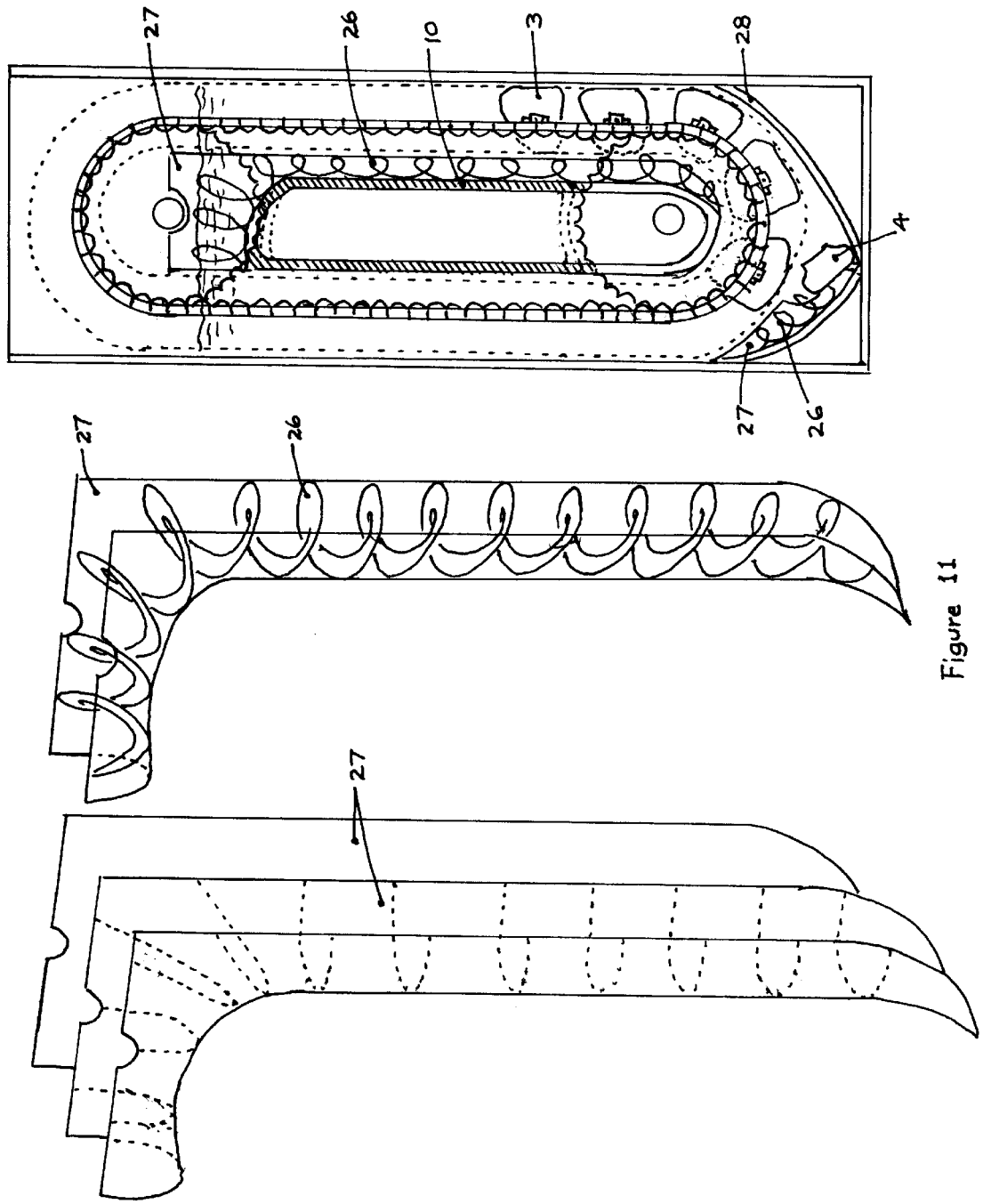
FIG. 11 shows a side view and a blow up view of the vortex channel construction in a conceptual design for using the entire water vessel for vortex generation through water recirculation. Note that the cross section of the containers differs from the previous FIGS. 4–6 to enhance small volume of water to recirculate along with the moving units.

FIG. 11 shows a closed water vessel designed for water recirculation and for vortex generation. The flow adjusting baffle 10 separating the upward and downward moving water columns has been enlarged showing a hollow flat tubular section going through the middle of the vessel, and enclosing the space surrounding the lower axle. Separate upward moving water vortex channels are formed between the flow adjusting baffle and the ascending moving segment using baffle wall inserts 27 and vortex maintaining flow vane 26. The vortex maintaining vanes 26 and the wall inserts 27 are extended and positioned on top of the baffle 10 for transfer of water into the descending column. An identical set of vanes 26 and wall inserts 27 are positioned at the entrance to the convergent air/water vortex generators. At bottom a flow modifying panel 28 is placed next to the air/water vortex generators to push water away from the vessel wall and shift the vortex currents into the spacing between the flow adjusting baffle 10 and the ascending column segment. The bucket containers 3 are further modified by changing the cross section into a modified asymmetrical shape to enhance water flow shifted into the vortex channels, and by inserting partition walls inside bucket containers to maintain separate water whirls corresponding to individual water vortex channels. The insertion of partitioning walls add to the stiffness of the container structure.

SUMMARY OF THE ACHIEVEMENT OF THE OBJECTS OF THE INVENTION

From the foregoing, it is apparent that I have invented methods for design of high volume air ingestion system with air/water vortex generators, two methods for reducing water resistance and surface friction of a generic buoyancy engine, and a method for optimization in selecting the shape of the box containers. The engine was reconfigured from the basic generic form to incorporate the invented improvement.

It is to be understood that the foregoing description and specific embodiments are merely illustrative of the best mode of the invention and the principle thereof, and that various modifications and additions may be made to the apparatus by those skilled in the art, without departing from the spirit and scope of this invention, which is therefore understood to be limited only by the scope of the appended claims.

I claim:

1. A method of transporting uninterrupted stream of air without forming air bubbles through water medium using a convergent air/water vortex generating means, comprising the steps of:
   a) converting unregulated compressed input air into air vortex using an air stream modifying means,
   b) generating a water column in rotation to form a water vortex using a whirl motion inducing hydromechanical means housed inside a constrictive outer support casing having a narrowing diameter forming a convergent flow guide,
   c) releasing said air in vortex motion through the central axis of said water vortex column ejected from the support casing, and
   d) choosing either a left-handed rotational direction as seen from top for compressor vanes and stator vanes for operating unit in northern hemisphere to exploit contribution of Coriolis force effect, or a right-handed direction as seen from top in southern hemisphere.

2. A method of decreasing water resistance and surface friction of a submerged moving segment of a buoyancy engine for (i) forming conformal surfaces without discontinuities on all sides, and (ii) avoiding exposure of frontal surfaces, furthermore, with additional functions (iii) facilitating ingestion of water into container buckets on water surface, and (iv) to ingest air fully without spilling outside at water depth, comprising the steps of
   a) installing movable skirt panels mounted on each container bucket forming conformal surfaces on all sides extending from the container bucket's edges, and avoiding exposure of the frontal segment of the next adjacent follower container bucket, and
   b) attaching guide rail/follower guide wheel combination mechanical means for opening the outer side movable skirt panel of each container bucket on water surface and at bottom depth for ingestion of water and air respectively.

3. An apparatus for convergent air/water vortex generating means according to claim 1, comprising
   a) an assembly of multiple open end spiral air conduits with progressively decreasing cross section area and exit orifice nozzles forming an air vortex generating means, connected to an external high pressure air supply source,
   b) a truncated cone shaped, bundle assembly of vertically positioned open end spiral conduits, each with decreasing cross section area, having air bubbles injected into from bottom mounted bubble discharge means to push water upward, constituting a water whirl generating means,
   c) an air bubble discharge means, consisting of air feed pipes arranged in concentric circular form placed beneath said spiral conduit assembly, with small diameter cone extrusion shape bubble discharge orifices perforated along pipe lengths to achieve smallest possible surface tension in release of bubbles; connected to external high pressure air supply source,
   d) an optional outer casing, with fixed spiral stator vanes mounted inside its top portion of narrowing diameter, forming convergent water vortex exit housing for said spiral conduit assembly; with its water vortex exit opening surrounding said compressed air vortex exit nozzle, and
   e) externally supplied rotational means for rotating the entire completed assembly a)–d) about its central axis.

4. An apparatus for convergent air/water vortex generating means according to claim 1, comprising
   a) an assembly of multiple open end spiral air conduits with progressively decreasing cross section area and exit orifice nozzles forming an air vortex generating means, connected to an external high pressure air supply source,
   b) an assembly of single/multiple stage compressor with vanes mounted on periphery of rotating disks, or of a spiral screw shaped compressor stage with paddles spanning between thread spaces; powered and rotated by external mechanical means,
   c) an outer housing, with fixed spiral stator vanes installed above said single/multple stage compressor, or spiral screw shaped compressor, and with progressively narrowed diameter casing for the exit opening of convergent water vortex; having said exit nozzles of said compressor air vortex generator surrounded by the water vortex exit opening at its central axis.

5. An apparatus for convergent air/water vortex generating means according to claim 1 comprising
   a) an assembly of multiple open end spiral air conduits with progressively decreasing cross section area and exit orifice nozzles forming an air vortex generating means, connected to external high pressure air supply source,
   b) an assembly of single/multiple stage compressor with vanes mounted on periphery of rotating disks, or of a spiral screw shaped compressor stage with paddles spanning crosswise between thread spaces; powered and rotated by high pressure water jets aimed at peripheral driving vanes, or paddles, ejected from high pressure water jet nozzles along tangential direction on the inner side surface of the circular feeding pipe; having the high pressure water supplied from an external supply source, and
   c) an outer housing, with fixed spiral stator vanes installed above said single/multiple stage compressor, or spiral screw shaped compressor, and with progressively narrowed diameter casing for the exit opening of convergent water vortex; having said high pressure water jet pipe and jet nozzles installed on its inside surface; having the exit nozzles of said compressed air vortex generator surrounded by the water vortex exit opening at its central axis.

6. An apparatus for convergent air/water vortex generating means according to claim 1 comprising
   a) an assembly of multiple open end spiral air conduits with progressively decreasing cross section area and exit orifice nozzles forming an air vortex generating means, connected to external high pressure air supply source, b) an assembly of single/multiple stage compressor made of hollow wheel bodies and vane spokes, or of a spiral screw shaped hollow body with paddles spanning crosswise between thread spaces; powered and rotated by ejection of high pressure water jets along tangential direction from jet ejection orifices installed on periphery of the hollow body; and having the high pressure water supplied from an external source, and c) an outer housing, with fixed spiral stator vanes installed above said single/multiple stage compressor, or spiral screw shaped compressor, and with progressively narrowed diameter casing for the exit opening of convergent water vortex; having the exit nozzles of said compressed air vortex generator surrounded by the water vortex exit opening at its central axis.

7. An apparatus designated as a modified buoyancy engine, comprising a) two pairs of notched conveyer wheels mounted on each of two horizontal axles and a pair of two vertically positioned, notched, infinite loop conveyer belts, spanning between said conveyer wheels; having the axle shafts extended outward thereof, b) a watertight vessel, housing said conveyer belt system inside, with fixed support means for mounting the horizontal axles, comprising roller bearings and watertight seals, having adjusting means for height position of the upper axle for tightening conveyer belts; having water filled up to a height just beneath the upper horizontal axle and its water level maintained, c) a plurality of airtight bucket containers securely mounted on the conveyer belt loops at equidistance with the container opening placed "up" on the downward moving column segment and "down" on the upward moving column segment, d) a flow adjusting baffle, separating water flows associated with the upward moving column segment and downward moving column segment; comprising flattened tubular construction as a cross member placed between the two side walls, on which said two horizontal axles are mounted, e) a multiplicity of said convergent air/water vortex generating means positioned at the bottom of said vessel to transport high volume of air without forming air bubbles in the air ingestion process into said containers, and f) an electric or mechanical output application means connected to said extended power output shaft of the lower horizontal axle.

8. An apparatus designated as a modified buoyancy engine in accordance with claim 7 wherein the length/width ratio of each bucket container is so chosen through a design analysis to satisfy the optimum value of 6 or greater, to minimize the friction force caused on the submerged segment of buoyancy engine by water flowing against its surface.

9. An apparatus designated as a modified buoyancy engine further modified according to claim 3 incorporating a) each container bucket having a pair of flow smoothing skirt panels, mounted on the lengthwise edges with hinges, whereas the skirt panels cover discontinuous surfaces of the submerged moving segment on all sides; with the outer side skirt panel having two follower guide wheels installed at the opposite ends, and b) two pairs of guide rails, installed on said vessel walls, one pair at the water surface and the other at the vessel bottom; mating with said follower guide wheels to force open said outer side skirt panels against the water flow for ingestion of water and air respectively.

10. An apparatus designated as a modified buoyancy engine in accordance with claim 9 further modified, so as to reduce surface friction force of the submerged vertical segments through decrease of the specific gravity of water at thin boundary layer, incorporating a) a set of effervescent bubble filled water generating means comprising; air bubble discharge pipes with cone extrusion shape bubble discharge orifices connected to high pressure air supply source, and b) distribution means; effected by configuring said air pipe to surround and by tilting the bubble ejection directions toward said segment surfaces for bubble discharge to cover each vertical segment and generate thin boundary layer on all the surfaces.

11. An apparatus designated as a modified buoyancy engine in accordance with claim 7 wherein said engine is further modified with:

a) practical minimum spacing between the submerged moving segment and the vessel walls, and between the descending segment and the flow adjusting baffle, the latter further enlarged to its maximum possible size encasing the lower horizontal axle;

b) having a plurality of water vortex channels installed between the baffle wall and the ascending moving segment using baffle wall inserts and vortex flow maintaining vanes to push water vortices upward maintaining the vortex motion, c) having vortex maintaining vanes and wall inserts installed on top of the flow adjusting baffle by extending those in b);

d) having similar vortex maintaining vanes and wall inserts installed at the entrance to convergent air/water vortex generators, e) having a wall insert at the output area of the convergent air/water vortex generating means to push water vortices away from the vessel wall and force the water shift into the vortex water flow channels prepared in b) and c), f) having the total water volume inside the vessel recirculated due to ejection force of said convergent air/water vortex generating means; each separately feeding into one of said vortex water flow channels, g) having the cross section of each bucket container modified into asymmetrical one to scoop stagnant water between containers and push into vortex channels, and h) having inside of each bucket container partitioned into sections with rounded cylindrical bucket shape, each to house and maintain water in whirl motion coming out of one of said convergent air/water vortex generating means.

* * * * *